United States Patent
Bagley et al.

(10) Patent No.: US 8,458,050 B2
(45) Date of Patent: Jun. 4, 2013

(54) INTERACTIVE PRODUCT CONFIGURATOR THAT ALLOWS MODIFICATION TO AUTOMATED SELECTIONS

(75) Inventors: Claire M. Bagley, Carlisle, MA (US); Martin P. Plotkin, Concord, MA (US); David J. Kulik, Carlisle, MA (US); Michael Colena, Lowell, MA (US); Gao Chen, Malden, MA (US); Joyce Ng, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 38 days.

(21) Appl. No.: 12/270,350

(22) Filed: Nov. 13, 2008

(65) Prior Publication Data

US 2010/0036747 A1 Feb. 11, 2010

Related U.S. Application Data

(60) Provisional application No. 61/087,254, filed on Aug. 8, 2008.

(51) Int. Cl.
*G06Q 30/00* (2006.01)

(52) U.S. Cl.
USPC .......... 705/26.5; 705/21; 705/26.1; 705/26.2; 705/26.7; 705/29

(58) Field of Classification Search
None
See application file for complete search history.

(56) References Cited

U.S. PATENT DOCUMENTS

| | | | | |
|---|---|---|---|---|
| 5,576,965 | A * | 11/1996 | Akasaka et al. | 700/97 |
| 6,609,108 | B1 * | 8/2003 | Pulliam et al. | 705/26.5 |
| 6,937,997 | B1 * | 8/2005 | Parulski | 705/17 |
| 7,010,746 | B2 * | 3/2006 | Purvis | 715/249 |
| 7,051,032 | B2 | 5/2006 | Chu-Carroll et al. | |
| 7,236,983 | B1 * | 6/2007 | Nabors et al. | 1/1 |
| 7,558,790 | B1 | 7/2009 | Miller et al. | |
| 7,584,079 | B2 * | 9/2009 | Lichtenberg et al. | 703/2 |
| 7,650,296 | B1 | 1/2010 | Brunner | |
| 7,865,344 | B2 | 1/2011 | Wozniak | |
| 7,970,720 | B1 | 6/2011 | Heidenreich et al. | |
| 2002/0010655 | A1 * | 1/2002 | Kjallstrom | 705/27 |
| 2002/0143653 | A1 * | 10/2002 | DiLena et al. | 705/26 |
| 2004/0054692 | A1 | 3/2004 | Seyrat et al. | |
| 2004/0111327 | A1 * | 6/2004 | Kidd et al. | 705/26 |
| 2005/0044525 | A1 * | 2/2005 | Lazarov | 717/104 |
| 2005/0097437 | A1 | 5/2005 | Green et al. | |
| 2005/0278271 | A1 * | 12/2005 | Anthony et al. | 706/919 |
| 2006/0184468 | A1 | 8/2006 | Adir et al. | |
| 2007/0112609 | A1 | 5/2007 | Howard et al. | |
| 2007/0294270 | A1 | 12/2007 | Gregory et al. | |
| 2008/0114710 | A1 | 5/2008 | Pucher | |
| 2008/0228657 | A1 * | 9/2008 | Nabors et al. | 705/80 |

OTHER PUBLICATIONS

Oracle Configurator, Modeling Guide Release 12, Dec. 2006, Part No. B28683-02.*

Oracle Configurator, Modeling Guide Release 11i, Jun. 2003, Part No. B10943-01.*

* cited by examiner

*Primary Examiner* — Fateh Obaid
(74) *Attorney, Agent, or Firm* — Miles & Stockbridge P.C.

(57) ABSTRACT

A product configurator includes a constraint based network that includes a plurality of nodes. The configurator receives one or more user selections and generates one or more automatic selections to form a complete configuration. The configurator receives a request to change the configuration after forming the complete configuration, and retracts the automatic selections. For each of the retracted automatic selections, the configurator determines if the retracted automatic selection is a configuration-defining selection and reasserts the configuration-defining selections.

18 Claims, 10 Drawing Sheets

INTERACTIVE PRODUCT CONFIGURATOR THAT ALLOWS MODIFICATION TO AUTOMATED SELECTIONS

RELATED APPLICATIONS

This application claims the benefit of U.S. Provisional Application No. 61/087,254, filed Aug. 8, 2008.

FIELD OF THE INVENTION

One embodiment is directed generally to computer interaction, and in particular to an interactive product configurator.

BACKGROUND INFORMATION

Many current products and services can be customized by a user/customer before being purchased. For example, computer systems typically include many possible options and configurations that can be specifically selected or configured by the customer. Other examples of highly configurable products and services include telephone switching systems, airplanes, automobiles, mobile telephone services, insurance policies, and computer software.

Product and service providers typically provide a "product configurator" that allows a customer or sales engineer to interact with a computer in order to customize and configure a solution by selecting among optional choices. Some known product configurators are constraint based. For these configurators, constraints are enforced between optional choices, allowing the user to select the choices they want, while validating that the resulting set of user choices is valid.

SUMMARY OF THE INVENTION

One embodiment is a product configurator that includes a constraint based network that includes a plurality of nodes. The configurator receives one or more user selections and generates one or more automatic selections to form a complete configuration. The configurator receives a request to change the configuration after forming the complete configuration, and retracts the automatic selections. For each of the retracted automatic selections, the configurator determines if the retracted automatic selection is a configuration-defining selection and reasserts the configuration-defining selections.

DETAILED DESCRIPTION

One embodiment is a constraint based interactive configurator that can auto-complete a configuration by automatically making decisions to reach a valid and complete configuration state. The configurator further allows a user to incrementally modify the auto-complete decisions without producing undesired conflicts and while maintaining as much decision consistency as possible.

Figure 1:
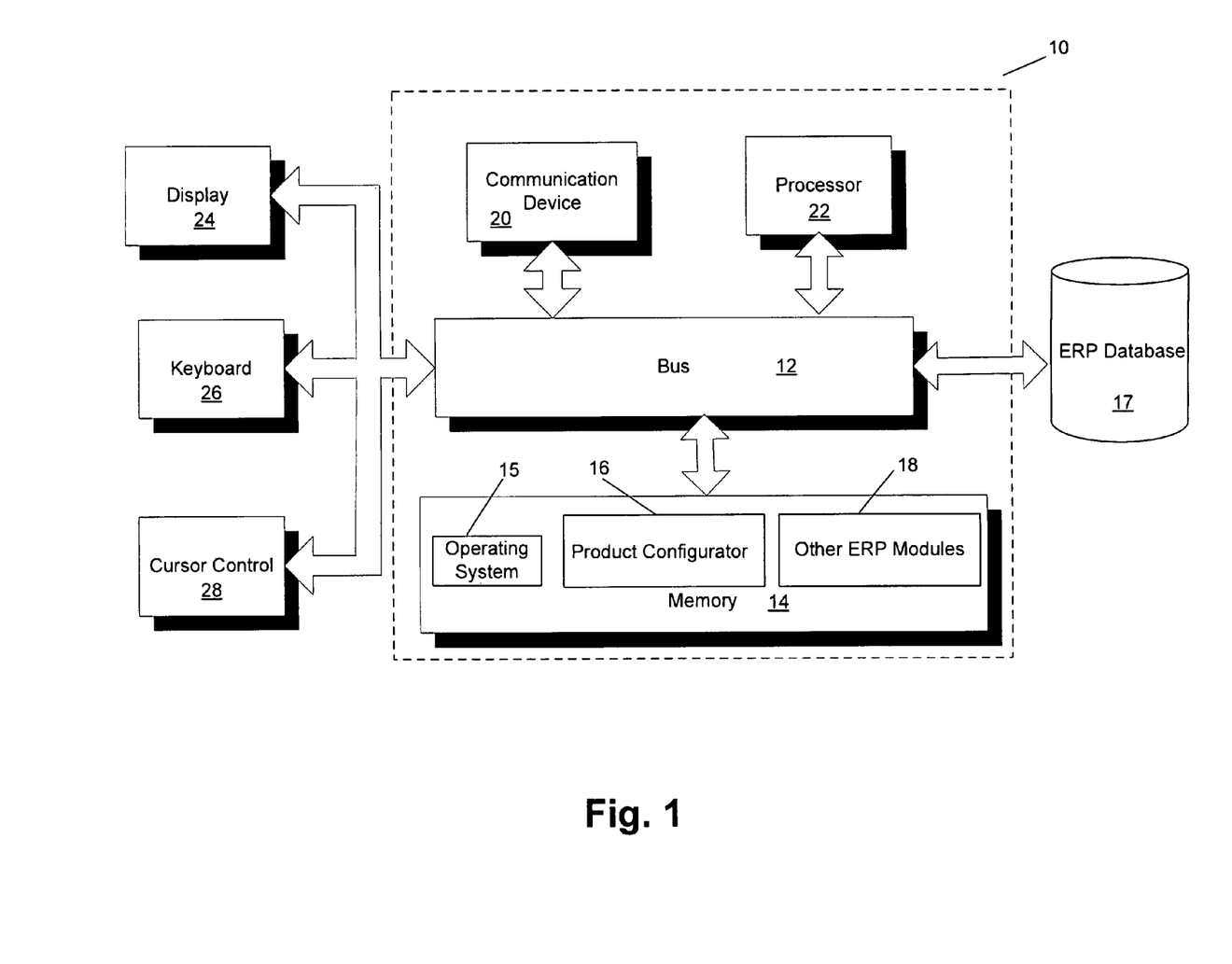
FIG. 1 is a block diagram of a system that can implement an embodiment of the present invention.

FIG. 1 is a block diagram of a system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a product configurator 16 that performs interactive product configuration as disclosed in more detail below. The modules further include other enterprise resource planning ("ERP") modules 18 of an ERP system that may interact with product configurator 16, such as a bill of material ("BOM") module and a customer relationship manager ("CRM") module. An ERP system is a computer system that integrates several data sources and processes of an organization into a unified system. A typical ERP system uses multiple components of computer software and hardware to achieve the integration. A unified ERP database 17, coupled to bus 12, is used to store data for the various system modules. In one embodiment, ERP modules 18 are part of the "Oracle E-Business Suite Release 12" ERP system from Oracle Corp. In other embodiments, product configurator 16 may be a stand-alone system and not integrated with an ERP system, or may be part of any other integrated system.

In one embodiment, product configurator 16 allows a user to interactively configure a product or service by choosing options. Product configurator 16 in one embodiment is constraint based in that it solves a constraint problem to arrive at a solution (i.e., an appropriate and valid configuration). A constraint problem is a problem with a given set of variables, a given set of values or range of values (referred to as a "domain") for each variable, and a given set of constraints. Each constraint restricts the values, from the set of values, that may be simultaneously assigned to each variable of the set of variables. The solution is a combination of assignments of values to each variable that is consistent with all constraints.

A configuration "model" is created in order to implement a configurator. A model represents a generic framework of a solution, or of many possible solutions, to a problem, and includes a classification of associated model entities. The model entities are referred to as "nodes" and represent the domains of the constraint based system. A model may represent an apparatus, such as an automobile, with various option packages; a system such as a telecommunications network, with various hardware, software, protocol and service options; a suite of available services; a suite of software applications, etc. A constraint network is a set of nodes linked by constraints.

When a model is created and executed by product configurator 16, a user can interact with the model. The interaction in general involves the user being presented with a series of choices or items. Each item is represented by a variable in the underlying constraint system. Each variable has a domain, which is a range or set of possible values (e.g., integers between 0 and 10, the set of blue, red or green, etc.). As choices are made by the user, the domain may shrink. For example, if the configurator is for a car, the user may choose a sedan instead of a convertible. However, in the next choice, which is the color of the car, red may no longer be available because a sedan cannot be configured in red. If a user backtracks and decides not to choose a sedan, the color red should be restored as one of the color choices. In prior art configurator systems, a restart is typically required to restore the color red. In contrast, in one embodiment, the change of domains is efficiently tracked and stored so changes as a result of backtracking or other reasons can easily be undone.

Figure 2:
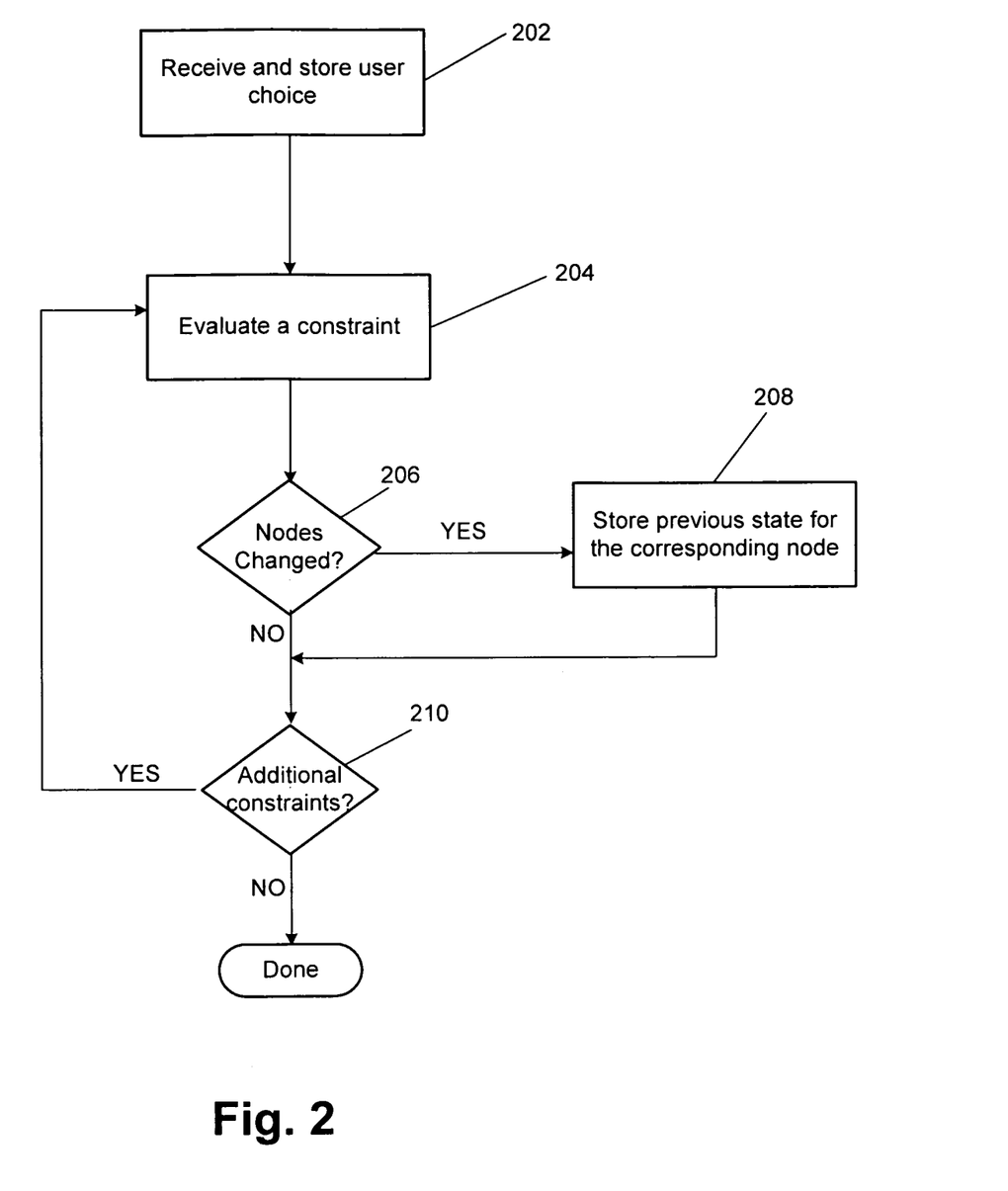
FIG. 2 is a flow diagram of the functionality of a product configurator when a user makes a choice when interacting with a configurator model in accordance with one embodiment.

FIG. 2 is a flow diagram of the functionality of product configurator 16 when a user makes a choice when interacting with a configurator model in accordance with one embodiment. In one embodiment, a user choice is any representation of an action by the user in the configurator user interface ("UI"). Examples of a user choice include clicking a checkbox, entering a number in a box, choosing a number or choice within a drop down box, etc. The user choices are added and managed in a manner that allows for efficient backtracking and/or negation. In one embodiment, the functionality of the flow diagram of FIG. 2, and FIGS. 5 and 9 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, the user choice is received and stored. The user choice can be stored using any type of internal representation of the choice and in one embodiment is stored in memory 14.

The user choice at 202 may cause one or more associated outward constraints in the constraint network to be affected (i.e., due to the propagation of the user choice throughout the constraint network), which may modify the associated node for each constraint.

At 204, the first/next outward constraint affected by the user choice at 202 is evaluated.

At 206, it is determined if the node for the constraint has changed. If so, at 208 the previous state for the node is stored and associated with the added user choice at 202.

At 210, if the node for the constraint has not changed, or after storing the previous state at 208, it is determined if there are additional constraints to evaluate from the user choice. If there are, the flow returns to 204. In this manner, the propagation of the entire constraint network as a result of the user choice 202 is evaluated and the previous state of any nodes that have changed in response to the user choice is saved.

When the functionality of FIG. 2 is complete, for each node affected by propagation in the constraint network, the prior domain state is recorded and is associated with the current choice. In one embodiment, the functionality of FIG. 2 is executed for every new user choice and for all other decisions, including default decisions, auto-completion decisions, and any other decisions made by the user or by product configurator 16 without direct input from the user.

Figure 3:
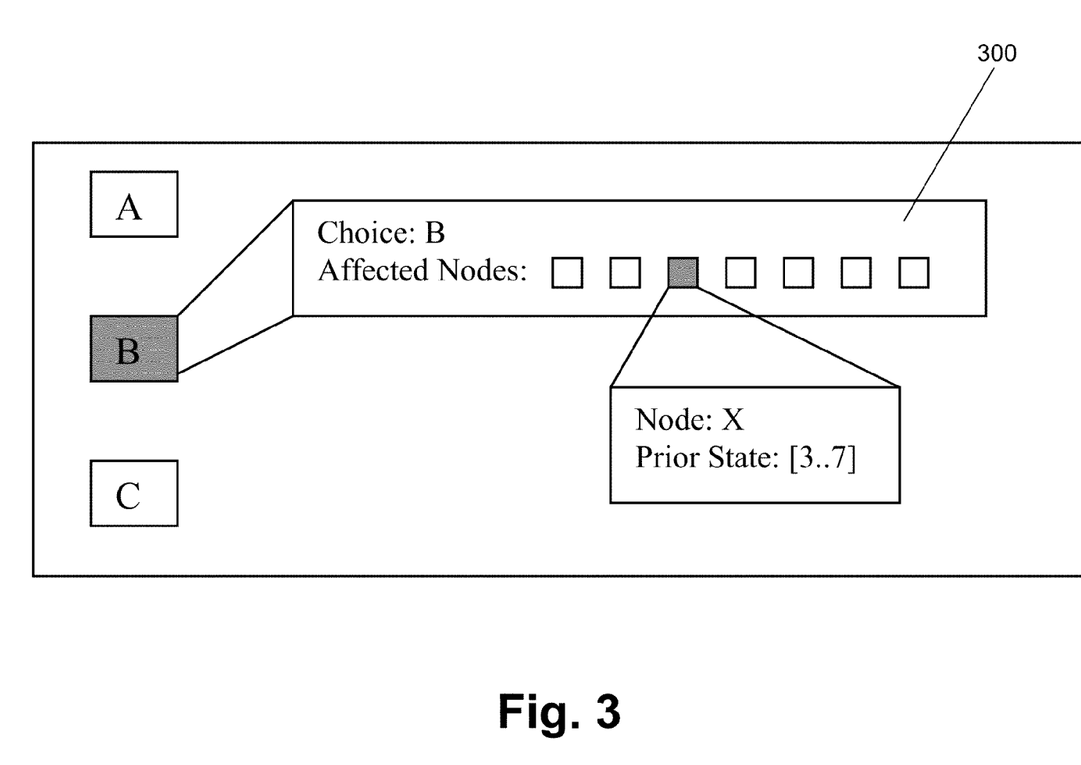
FIG. 3 illustrates the functionality of FIG. 2 when a user choice is received in accordance with one embodiment.

FIG. 3 illustrates the functionality of FIG. 2 when a user choice is received in accordance with one embodiment. As shown in the example of FIG. 3, a user has made a choice A, followed by choice B, followed by choice C. Each choice contains a set of affected nodes in the constraint network. For choice B, the affected nodes are shown in box 300. As shown, one of the affected nodes for choice B, node X, has a prior state of a numerical range of 3-7. This prior state is what is recorded at 208 of FIG. 2. Because for each user choice the prior state of each affected node is stored, embodiments of the present invention can efficiently remove prior user choices (i.e., backtracking by the user) or any other types of choices without requiring a restart of the system.

A complete configuration solution is one in which a valid selection has been made for each possible choice within the product structure and that reduces the domain of each variable in the constraint network to a single value. For complex product offerings, the end user may need to make many choices to reach a valid and complete state. Additionally, the end user may not have the necessary domain expertise to properly specify all choices, or may have no preferences with regard to many of the choices. Some known constraint based configurators provide a method for automated selection (referred to as "auto-completion"), which uses heuristic search to make automated choices on behalf of the end user to reach a valid and complete configuration state and to go from a partial solution to a complete solution.

During auto-completion, arbitrary choices are made by the configurator. However, in some instances the automated selections may not be satisfactory to the end user. When this happens, a configurator should allow the user to specify alternate choices. However, a fully completed configuration cannot be readily changed, as the completion process has eliminated the alternate possible choices from the configuration. In that state, every attempt to change the configuration produces a conflict which the user must resolve.

One way to avoid these conflicts is simply to undo the auto-completion, (i.e., remove all the automatic selections). However, this essentially forces the user to start over, and assumes that the user disliked all of the automatic selections when the user may only want to modify a few of the auto selections. One embodiment of the present invention provides the user a way to incrementally modify the auto-completed configuration, without producing undesired conflicts and while maintaining as much context as possible.

In one embodiment, product configurator 16 distinguishes configuration components and selections into two categories: (1) "configuration-defining elements" that define the resulting configuration; and (2) "non-configuration-defining elements" that merely support the configuration process. Configuration-defining elements/selections are elements that would typically appear on a product order document or product specification as part of the description of the configuration, including orderable items or options and their attributes. Non-configuration-defining elements/selections are elements that would not typically appear on the order document, and may include such elements as questions and answers for a customer needs assessment, or values introduced by the configuration modeler to represent intermediate results of computations. Arbitrary automatic selections of non-configuration-defining elements are generally not a direct concern of the user and can be removed by the configurator without significantly impacting any user choices.

For example, if the product is a computer system, it may include three configuration defining elements (the values are in brackets and the types of variables are in parenthesis): (1) Hard drives [100G, 300G, 500G] (integer variable); (2) Monitor [20 inch, 24 inch, 30 inch] (integer variable); (3) CPU [3.73 GHz Dual Core, 2.2 GHz Quad Core] (Set variable). The computer system may also include a non-configuration defining element of: Is gaming system? (Boolean variable), which asks the question of whether the computer will be a gaming system or not.

Figure 4:
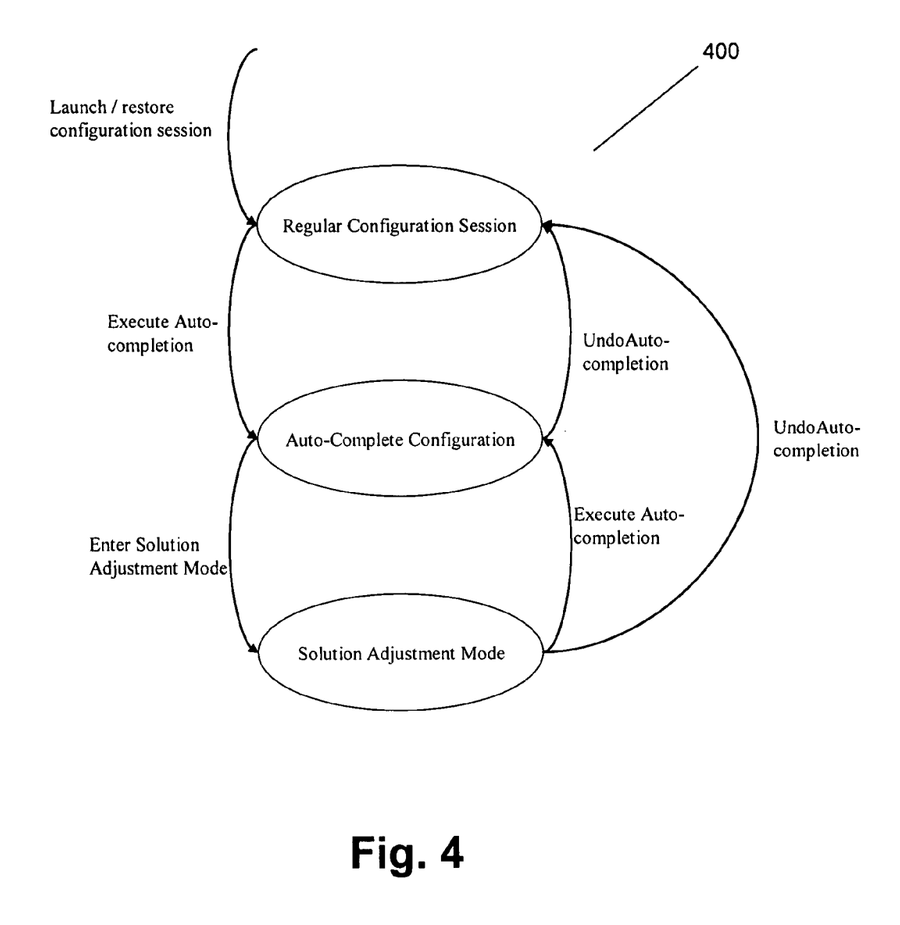
FIG. 4 is a state diagram that illustrates the three states of operation for the product configurator in accordance with one embodiment.

In one embodiment, product configurator 16 operates in one of three states: (1) Regular configuration session; (2) Auto-complete configuration; and (3) Solution adjustment mode. FIG. 4 is a state diagram 400 that illustrates the three states of operation for product configurator 16 in one embodiment. The regular configuration session is a session where the user is making choices/selections/decisions by interacting with the configurator. During the regular configuration session, not all components may have a value assigned yet, and there is no retained auto-completion. Only user choices are retained. The auto-complete configuration is entered through the regular configuration session. In the auto-complete configuration, auto-completion is executed so that all components in the configuration have a value. The solution adjustment mode is entered from the auto-complete configuration and is used to modify the results of the auto-completion. Solution adjustment mode allows a user to adjust the configuration after auto-completion if the result is not entirely satisfactory. When exiting solution adjustment mode, not all components may have assigned a value, and auto-completed decisions/selections may not be retained while user decisions may be retained.

Figure 5:
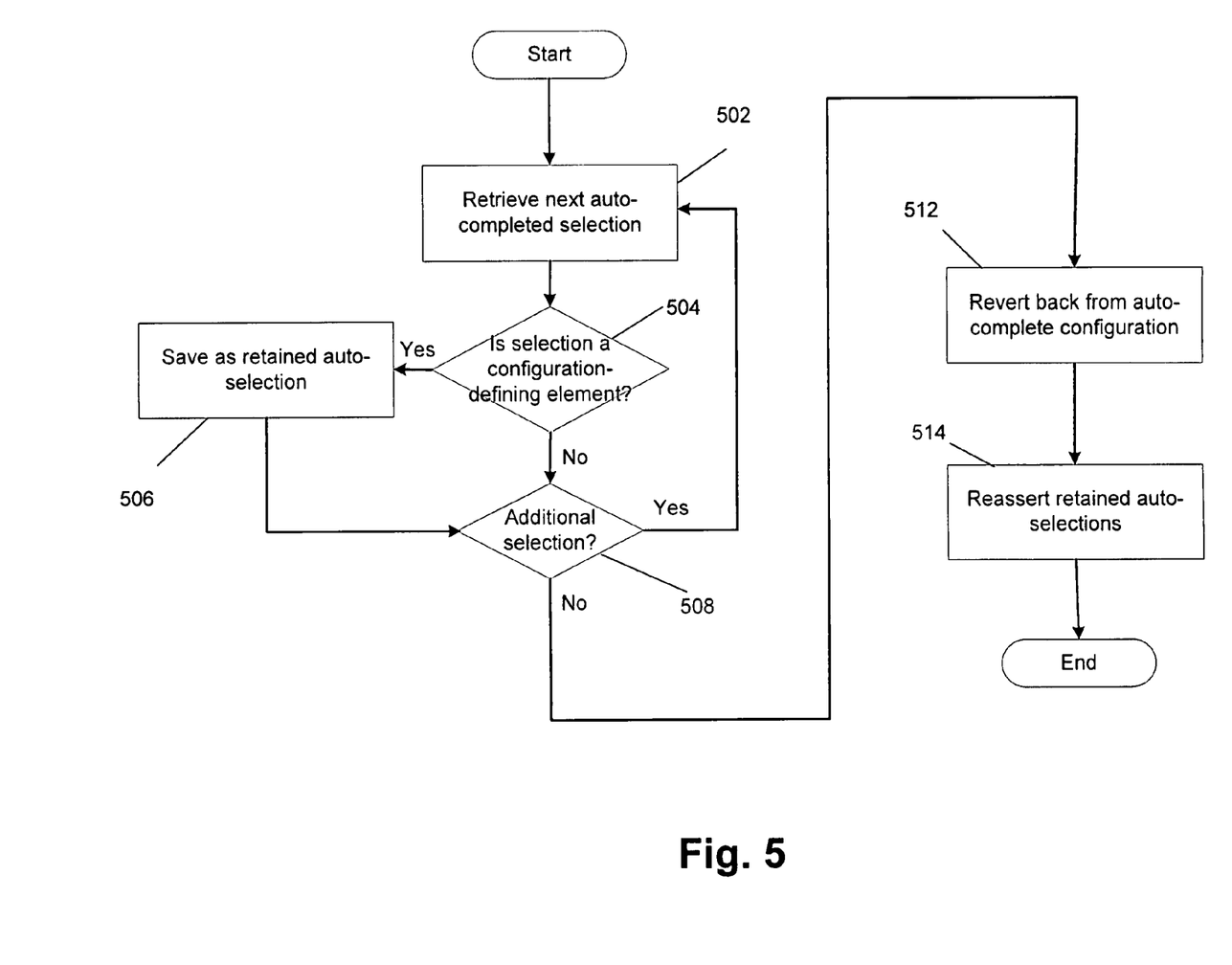
FIG. 5 is a flow diagram of the functionality of the product configurator when it retracts only non-configuration-defining elements in solution adjustment mode.

In one embodiment, in solution adjustment mode, system 10 retains the auto-completed selections of configuration-defining elements, but retracts any auto-completed selections of non-configuration-defining elements, if necessary. This reduces the likelihood of undesired conflicts. FIG. 5 is a flow diagram of the functionality of product configurator 16 when it retracts only non-configuration-defining elements in solution adjustment mode in accordance with one embodiment.

At 502, the next auto-completed selection from the list of auto-completed selections (i.e., all selections/choices made during auto-completion) is retrieved.

At 504, it is determined if the auto-completed selection is a selection of a configuration-defining element. If yes, at 506, the selection is saved as a retained auto-completed selection.

Functionality resumes at 508. If no at 504, at 508 it is determined if additional auto-completed selections are available. If yes, functionality resumes at 502. If no at 508, functionality resumes at 512.

At 512, product configurator 16 reverts back from auto-complete configuration by retracting all of the selections/choices made during auto-completion. When a selection is retracted at 512, the state of all affected nodes of the network before that selection was applied is restored. The prior domain state was previously stored when the auto-completed selection was asserted and the functionality of FIG. 2 was executed.

At 514, the retained auto-completed selections at 506 are reasserted.

Figure 6:
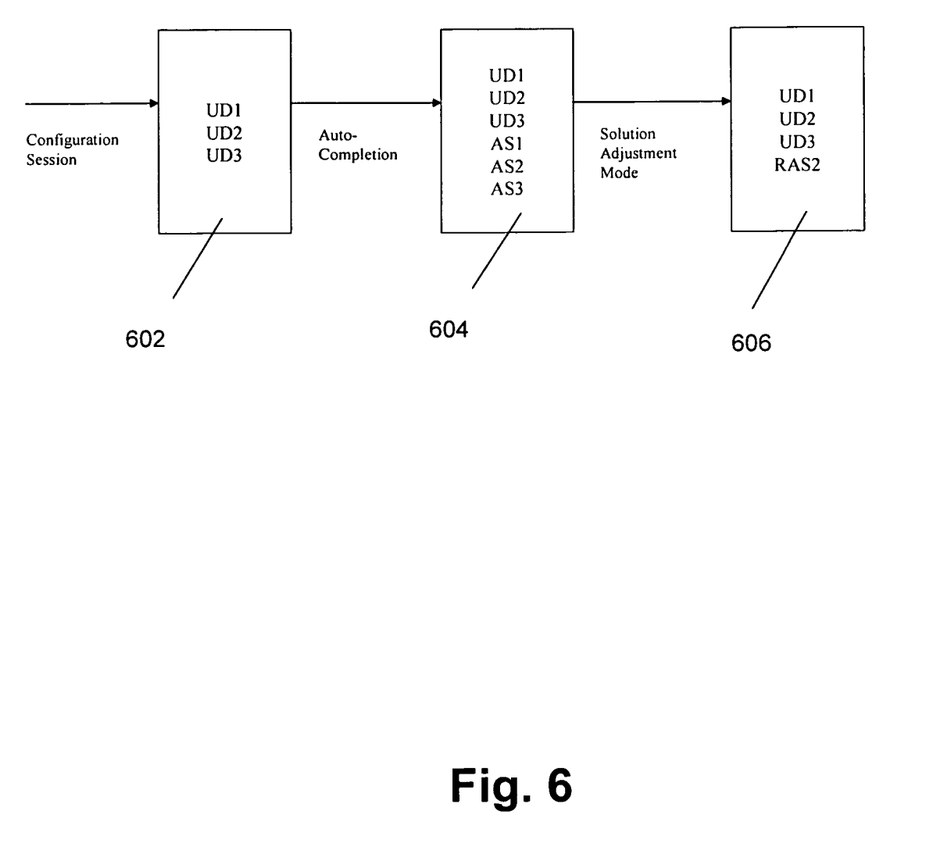
FIG. 6 illustrates an example of the functionality of the product configurator when it retracts only non-configuration-defining elements in solution adjustment mode in accordance with one embodiment.

FIG. 6 illustrates an example of the functionality of product configurator 16 when it retracts only non-configuration-defining elements in solution adjustment mode in accordance with one embodiment.

During the regular configuration session 602, the end user asserts three user decisions (i.e., UD1, UD2, and UD3). The end user then moves forward to auto-completion mode 604 and product configurator 16 automatically selects a value for all remaining components in the configuration while respecting all the constraints (i.e., auto selections AS1, AS2, and AS3). The end user then decides to adjust the configuration by entering solution adjustment mode 606. Assuming that only AS2 is a selection of a configuration-defining element, only AS2 is retained (i.e., retained auto selection RAS2) and both AS1 and AS3 are retracted in the solution adjustment mode.

Figure 7:
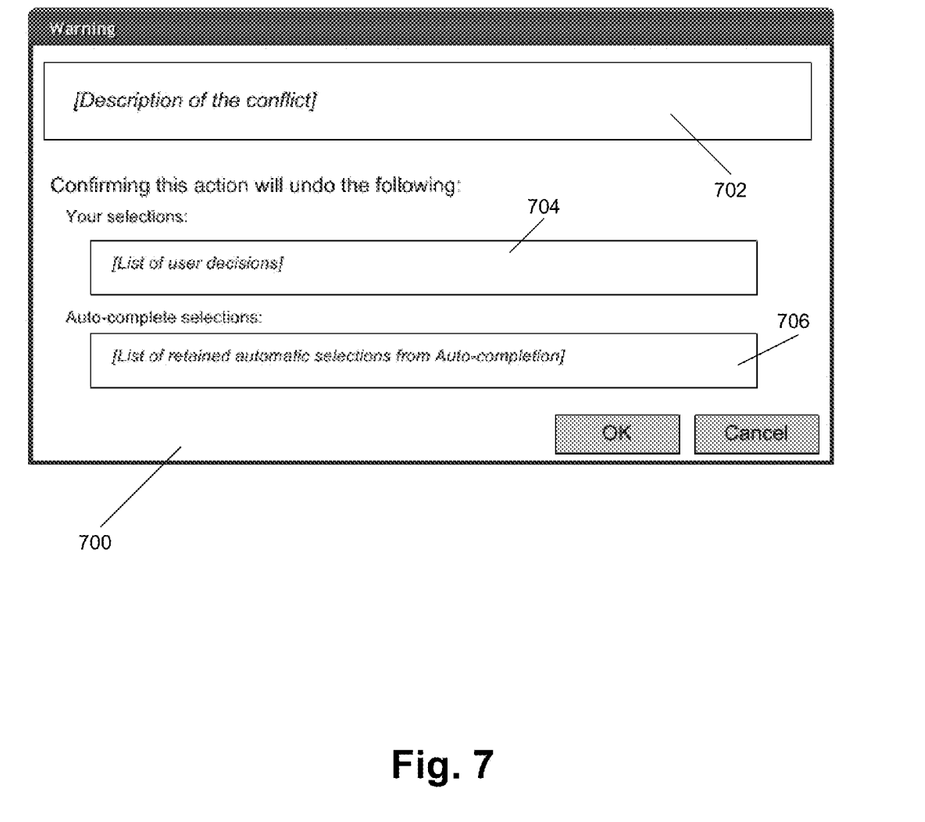
FIG. 7 is a user interface in accordance with one embodiment that presents conflicts to the user and distinguishes between retained automatic selections and actual user decisions.

In one embodiment, in solution adjustment mode, system 10 distinguishes conflicts from auto-completion selections of configuration-defining elements with conflicts from user decisions. For example, if a conflict is detected while the user is making a new user choice, a list of the conflicting choices will be presented to the user via a user interface. The list of conflicts may include previous choices that were made by the user and retained automatic selections of configuration-defining elements. The user may then decide whether to proceed with their new choice at the expense of the presented list of conflicted choices, or forfeit the new choice. A user typically feels more strongly about retaining prior user choices in contrast to decisions that were automatically selected without direct user interaction. Therefore, in one embodiment, system 10 distinguishes to the end user between actual user decisions and the retained automatic selections. FIG. 7 is a UI 700 in accordance with one embodiment that presents conflicts to the user and distinguishes between retained automatic selections and actual user decisions. The description of the conflict is provided in box 702. The list of user decisions/choices is provided in box 704, and the list of retained auto-complete selections are provided in box 706. In other embodiments, user decisions and retained auto-complete selections may be distinguished by an icon or symbol or any other means.

In one embodiment, in the solution adjustment mode, product configurator 16 ensures that the user's decisions to modify the configuration are given higher precedence than the retained automatic selections of configuration-defining elements. Therefore, a changed decision has a higher precedence than all arbitrary automatic decisions. The precedence pertains both to modifications that conflict with other retained automatic selections and to those that do not. In order to maintain this precedence, in one embodiment product configurator 16 retracts the automatic selections prior to each user decision, and reasserts them afterward as far as possible without generating a conflict. The efficiency of this retraction process in one embodiment ensures that the repetitive retraction does not negatively impact performance.

Figure 8:
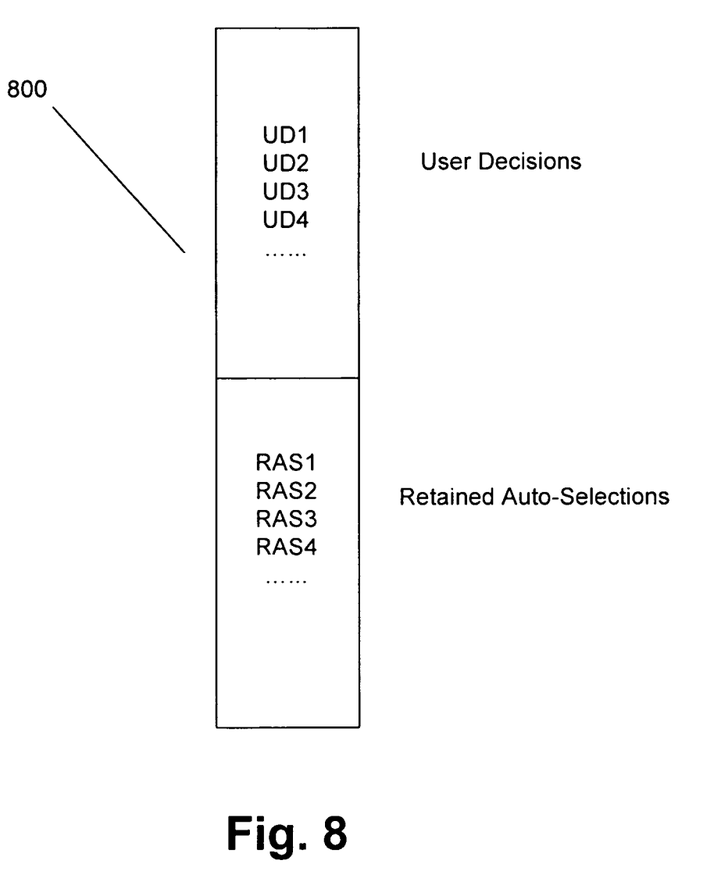
FIG. 8 is a block diagram of a queue in accordance with one embodiment.

In one embodiment, system 10 maintains a queue of decisions. FIG. 8 is a block diagram of a queue 800 in accordance with one embodiment. Queue 800 stores two different types of decisions: (a) User Decisions ("UD"s) and (b) Retained auto-selections ("RAS") (i.e., the retained automatic selections of configuration-defining elements). All UDs are placed in queue 800 before all RASs. The order guarantees the precedence among the requests—the higher the request is in the master queue, the higher its precedence. Any newly introduced selection will be inserted immediately after all the previously existing ones of the same type. For example, if there is a new UD5, it will be inserted after UD4 and before RAS1 in the request queue.

Figure 9:
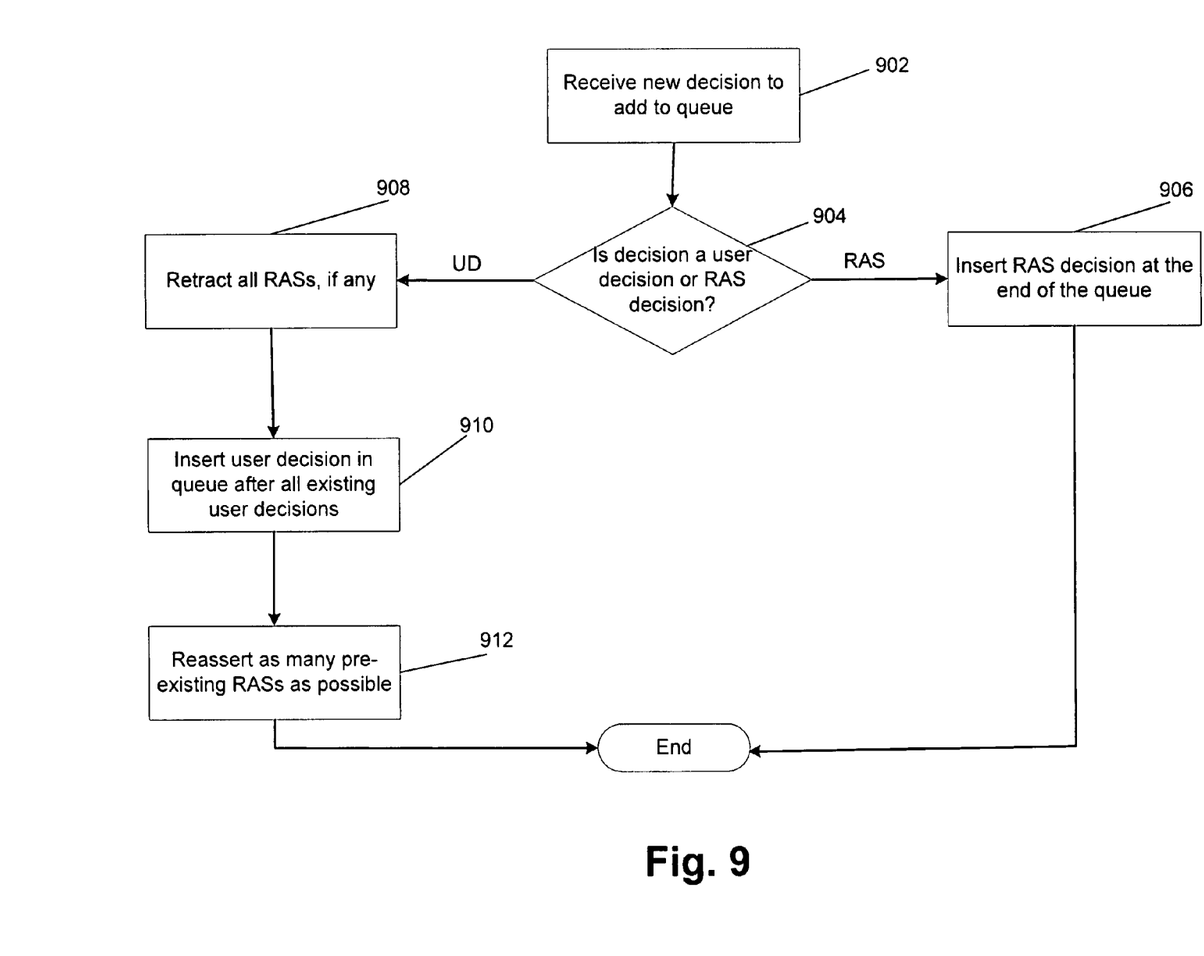
FIG. 9 is flow diagram of the functionality of the product configurator when it retracts and reasserts retained auto-selections in accordance with one embodiment.

FIG. 9 is flow diagram of the functionality of product configurator 16 when it retracts and reasserts retained auto-selections in accordance with one embodiment. At 902, a new selection/decision is received. At 904, it is determined if the decision is a user decision or a retained auto-selection decision. If the decision is a RAS at 904, at 906 the decision is inserted at the end of queue 800 of FIG. 8.

If the decision is a user decision at 904, at 908, the RASs, if any, are retracted. When retracting each RAS, the state of all affected nodes of the network before that selection was applied is restored. The prior domain state was previously stored when the RAS was asserted and the functionality of FIG. 2 was executed. At 910, the user decision received is inserted in queue 800 after all existing user decisions, but before any RASs. At 912, as many pre-existing RASs as possible are reasserted. An RAS is not reasserted if it results in a conflict. In one embodiment, an RAS that is not reasserted at 912 is stored in a list of all non-reasserted RASs. The list may be shown to the user.

In one embodiment, at any point while in the solution adjust mode, the user may exit the solution adjustment mode and again perform auto-completion. When exiting the solution adjustment mode, all retained automatic selections of configuration-defining elements are retracted, but any modification made while in solution adjustment mode are retained. The user's original selections, any modifications made while in solution adjustment mode, and any remaining automatic selection of configuration-defining elements are considered existing selections and will be part of the resulting complete configuration.

Figure 10:
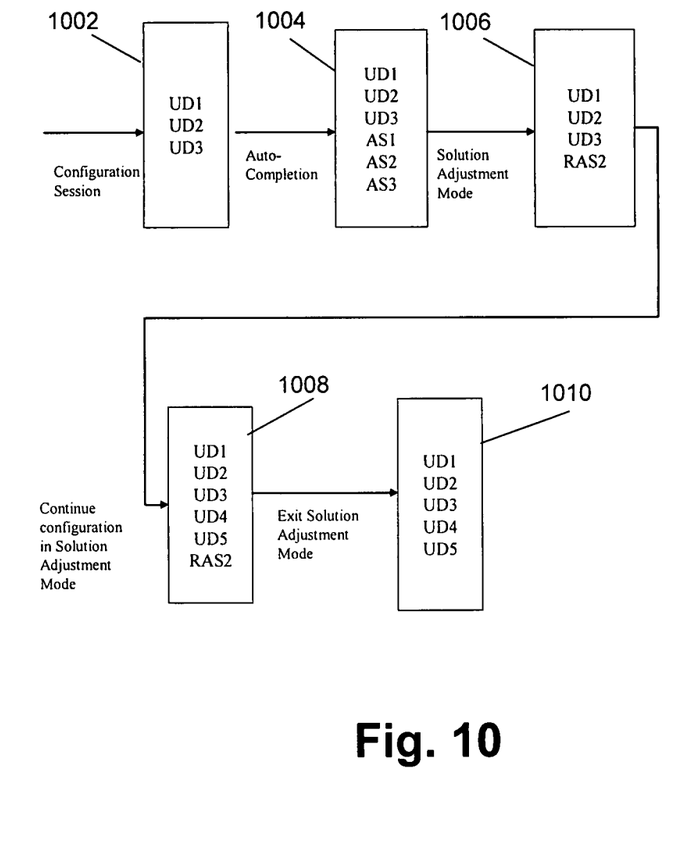
FIG. 10 illustrates an example of the functionality of the product configurator when exiting the solution adjustment mode and reentering the auto-completion mode in accordance with one embodiment.

FIG. 10 illustrates an example of the functionality of product configurator 16 when entering and exiting the solution adjustment mode in accordance with one embodiment. In a regular configuration session 1002, the end user asserts three user decisions: UD1, UD2, and UD3. The end user moves forward to auto-completion 1004 where system 10 automatically selects a value for all the remaining components in the configuration (i.e., automatic selections AS1, AS2, and AS3). The user proceeds to the solution adjustment mode 1006. In this example, only AS2 is for a configuration-defining element, so only AS2 is retained (i.e., retained automatic selection RAS2) and AS1 and AS3 are both retracted. The user continues interacting with product configurator 16 while in solution adjustment mode by adding UD4 and UD5 at 1008. The user then decides to exit the solution adjustment mode 1010 by undoing the auto-completion, which causes all the retained automatic selections to be retracted (i.e., RAS2 is retracted).

As disclosed, embodiments of the product configurator allow a user to modify a configuration after auto-completion without eliminating all of the auto-completion selections and forcing the user to start over. The retained auto-completion selections avoid unnecessary abrupt changes to the configuration.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer-implemented method of operating a product configurator that comprises a constraint based network that comprises a plurality of nodes, the method comprising:
   receiving one or more user selections from a user during a configuration session;
   generating one or more automatic selections during the configuration session to form a complete configuration when combined with the user selections, wherein the automatic selections are generated by a computer and wherein the automatic selections comprise configuration-defining selections that define the complete configuration, and non-configuration defining selections that support the configuration session;
   wherein for at least one of the automatic selections, the at least one automatic selection is propagated throughout the constraint network and the propagation affects one or more constraints;
   saving a prior state of a changed node, wherein the changed node corresponds to an affected constraint;
   associating the saved prior state with the at least one automatic selection;
   receiving a request from the user to change the configuration after forming the complete configuration;
   in response to the change request, entering a solution adjustment mode comprising:
     for each of the automatic selections, determining by the computer if the automatic selection is a first configuration-defining selection, or a first non-configuration defining selection;
     retaining by the computer the determined configuration-defining selections; and
     retracting by the computer the determined non-configuration defining selections, wherein the retracting comprises restoring a prior state of all nodes that were affected by each non-configuration defining selection when each non-configuration defining selection was asserted.

2. The method of claim 1, wherein the method further comprises:
   receiving a first selection;
   determining one or more first affected nodes of the plurality of nodes that are affected by the first selection; and
   for each first affected node, storing a first prior domain state of the node and associating the stored first prior domain state with the first selection.

3. The method of claim 2, wherein the first selection is a user selection.

4. The method of claim 2, wherein the first selection is an automatic selection.

5. The method of claim 2, wherein the first selection is an automatic selection and the retracting comprises restoring the stored prior first domain state for each affected node.

6. The method of claim 1, further comprising:
   forming a queue of the user selections and the retained automatic selections, wherein the user selections have a higher priority than the retained automatic selections.

7. The method of claim 6, further comprising:
receiving a new selection;
determining if the new selection is a new user selection;
if the selection is a new user selection, retracting all of the retained automatic selections in the queue;
inserting the new user selection after the existing user selections in the queue;
reasserting as many of the retracted automatic selections as possible.

8. The method of claim 1, further comprising:
receiving a new user selection;
detecting a conflict in response to the new user selection;
displaying on a user interface a list of conflicts, wherein the displaying distinguishes between user selections and reasserted automatic selections.

9. The method of claim 1, wherein the constraint based network comprises a plurality of variables and a plurality of constraints, and the complete configuration is formed when there is an assignment of a value to each of the variables that is consistent with the constraints.

10. A non-transitory computer readable medium having instructions stored thereon that, when executed by a processor, causes the processor to function as a constraint based product configurator comprising:
receiving one or more user selections from a user during a configuration session;
generating one or more automatic selections during the configuration session to form a complete configuration when combined with the user selections, wherein the automatic selections comprise configuration-defining selections that define the complete configuration, and non-configuration defining selections that support the configuration session;
wherein for at least one of the automatic selections, the at least one automatic selection is propagated throughout the constraint network and the propagation affects one or more constraints;
saving a prior state of a changed node, wherein the changed node corresponds to an affected constraint;
associating the saved prior state with the at least one automatic selection;
receiving a request from the user to change the configuration after forming the complete configuration;
in response to the change request, entering a solution adjustment mode comprising:
for each of the automatic selections, determining if the automatic selection is a first configuration-defining selection, or a first non-configuration defining selection; retaining the determined configuration-defining selections; and
retracting the determined non-configuration defining selections, wherein the retracting comprises restoring a prior state of all nodes that were affected by each non-configuration defining selection when each non-configuration defining selection was asserted.

11. The non-transitory computer readable medium of claim 10, further comprising:
receiving a first selection;
determining one or more first affected nodes of the plurality of nodes that are affected by the first selection; and
for each first affected node, storing a first prior domain state of the node and associating the stored first prior domain state with the first selection.

12. The non-transitory computer readable medium of claim 10, further comprising:
receiving a new user selection;
detecting a conflict in response to the new user selection;
displaying on a user interface a list of conflicts, wherein the displaying distinguishes between user selections and retained automatic selections.

13. A constraint based product configurator comprising:
a processor; and
a computer-readable medium coupled to the processor storing instructions that, when executed by the processor, cause the processor to:
receive one or more user selections from a user during a configuration session;
generate one or more automatic selections during the configuration session to form a complete configuration when combined with the user selections, wherein the automatic selections comprise configuration-defining selections that define the complete configuration, and non-configuration defining selections that support the configuration session;
wherein for at least one of the automatic selections, the at least one automatic selection is propagated throughout the constraint network and the propagation affects one or more constraints;
save a prior state of a changed node, wherein the changed node corresponds to an affected constraint;
associate the saved prior state with the at least one automatic selection;
receive a request from the user to change the configuration after forming the complete configuration;
in response to the change request, enter a solution adjustment mode comprising:
for each of the automatic selections, determine if the automatic selection is a first configuration-defining selection, or a first non-configuration defining selection;
retain the determined configuration-defining selections; and
retract the determined non-configuration defining selections, wherein the retracting comprises restoring a prior state of all nodes that were affected by each non-configuration defining selection when each non-configuration defining selection was asserted.

14. The non-transitory computer readable medium of claim 10, wherein the configurator comprises a plurality of variables and a plurality of constraints, and the complete configuration is formed when there is an assignment of a value to each of the variables that is consistent with the constraints.

15. The non-transitory computer readable medium of claim 11, wherein the first selection is an automatic selection.

16. The non-transitory computer readable medium of claim 11, wherein the first selection is an automatic selection and the retracting comprises restoring the stored prior first domain state for each affected node.

17. The non-transitory computer readable medium of claim 10, further comprising:
forming a queue of the user selections and the retained automatic selections, wherein the user selections have a higher priority than the retained automatic selections.

18. The non-transitory computer readable medium of claim 17, further comprising:
receiving a new selection;
determining if the new selection is a new user selection;
if the selection is a new user selection, retracting all of the retained automatic selections in the queue;
inserting the new user selection after the existing user selections in the queue;
reasserting as many of the retracted automatic selections as possible.

* * * * *